United States Patent [19]

Arimura et al.

[11] 3,849,794

[45] Nov. 19, 1974

[54] MAGNETIC TAPE TRANSFER DEVICE

[75] Inventors: Ichiro Arimura, Kyoto; Yutaka Higashida, Nishinomiya; Kozo Kurashina, Moriguchi, all of Japan

[73] Assignee: Matsushita Electric Industrial Co., Ltd., Kadoma-shi, Osaka, Japan

[22] Filed: May 29, 1973

[21] Appl. No.: 364,339

Related U.S. Application Data

[63] Continuation of Ser. No. 175,228, Aug. 26, 1971, abandoned.

[52] U.S. Cl. .................................... 360/17, 242/76

[51] Int. Cl. ............................................ G11b 5/86

[58] Field of Search...... 179/100.2 E; 226/196, 198; 242/76; 360/17

[56] References Cited

UNITED STATES PATENTS

| | | | |
|---|---|---|---|
| 2,448,519 | 9/1948 | Clapp | 226/198 |
| 2,726,859 | 12/1955 | Dolamore | 226/198 |
| 3,371,835 | 3/1968 | Pendleton | 226/198 |
| 3,627,917 | 12/1971 | Sugaya | 179/100.2 E |

*Primary Examiner*—Stuart N. Hecker
*Attorney, Agent, or Firm*—Stevens, Davis, Miller & Mosher

[57] ABSTRACT

In a magnetic tape transfer device wherein a recorded original tape and a non-recorded transfer tape with their magnetic surfaces in contact with each other are wound on a common take-up reel and a magnetic field is applied to them so that signals recorded on the original tape are transferred to the non-recorded tape, that portion of a tape-side control means disposed immediately before the take-up reel, which is pressed into contact with the tape sides, is supported elastically and movably in the transverse direction of the tape so as to maintain an almost constant tape-side pressure, thereby aligning the tape sides for improved transfer.

6 Claims, 7 Drawing Figures

FIG. 1
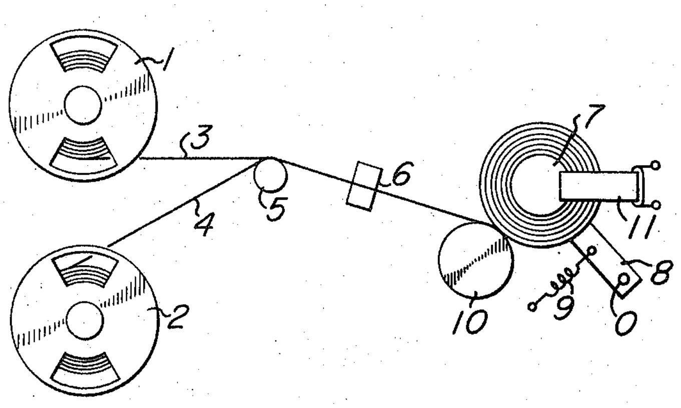
FIG. 2
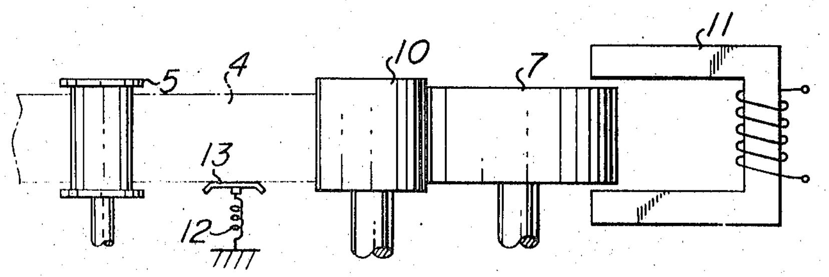
FIG. 3a FIG. 3b
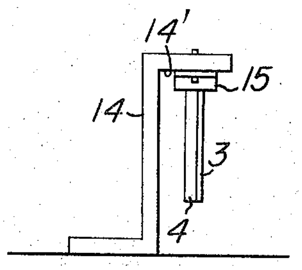
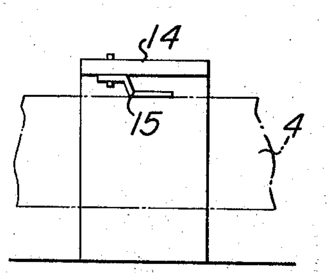
INVENTOR
BY
ATTORNEY

INVENTOR

BY

ATTORNEY

MAGNETIC TAPE TRANSFER DEVICE

This is a continuation, of application Ser. No. 175,228, filed Aug. 26, 1971, now abandoned.

BACKGROUND OF THE INVENTION

1. Field of the Invention

This invention relates generally to a magnetic tape transfer device for transferring information including video signals recorded in one magnetic tape to another non-recorded magnetic tape, or more in particular a magnetic tape transfer device in which a recorded original tape and a non-recorded transfer tape with their magnetized surfaces in contact with each other are wound on a common take-up reel and a magnetic field is applied to them so that imformation contained in the original tape is transferred to the non-recorded tape.

2. DESCRIPTION OF THE PRIOR ART

In an ordinary magnetic tape transfer device, an original tape and a transfer tape are wound together when a magnetic field is applied, and therefore they are not brought out of alignment.

In order to achieve a successful transfer with such a device, it is most important to wind up both tapes under certain conditions. One factor which contributes to a successful winding operation is the fact that the positions of both tapes are successfully controlled in the transverse direction. In other words, the sides of both tapes are brought into alignment. For this purpose, it is common practice to press the tape sides against a control surface at a point immediately before a take-up reel. Staggering of running tape, however, often causes an excessive force to be applied to the tape sides, bending or distorting the tapes with the result that the phase of the signals is affected and tape sides are damaged. Especially, this presents a serious problem in a high-speed winding operation.

SUMMARY OF THE INVENTION

Accordingly, it is an object of the invention to provide a magnetic tape transfer device wherein the sides of an original tape and transfer tape are brought in to alignment so that information signals recorded on the original tape may be faithfully transferred to the transfer tape. To achieve this object, the device of the invention comprises a tape-side control means having portions which are pressed into contact with the tape sides and elastically movable in the transverse direction of the tapes, thus preventing an excessive force from being applied to the tapes for successful transfer.

BRIEF DESCRIPTION OF THE DRAWINGS

FIG. 1 is a schematic diagram showing the construction of the magnetic tape transfer device according to the invention.

FIG. 2 is a front view of a first embodiment of the tape-side control means according to the invention, showing the nearest external means at the same time.

FIGS. 3*a* and 3*b* are respectively left side and front views of a second embodiment of the tape-side control means.

DESCRIPTION OF THE PREFERRED EMBODIMENTS

Figure 4A:
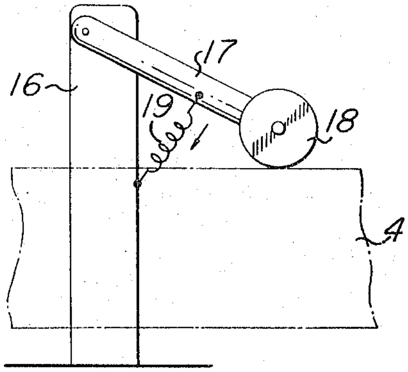
FIGS. 4*a* and 4*b* show front and right side views of a third embodiment of the tape-side control means.

Referring to FIG. 1, reference numerals 1 and 2 show reels for original and transfer tapes respectively, and an original tape 3 and transfer tape 4 which are wound off these reels are taken up on a take-up reel 7 through a tape-side control means 6 after their magnetic surfaces are brought into contact with each other by means of a guide roller 5 and are aligned in the transverse direction.

The take-up reel 7 has no flange and is rotatably mounted on a rotary arm 8 with supporting point 0. The rotary arm 8 is kept energized by a spring 9 so that the take-up reel 7 is pressed in contact with the capstan 10 at all times. Therefore, the latest-wound portion of the tapes on the take-up reel 7 is kept pressed against the capstan 10 from which the tapes derive driving power, while at the same time the tapes are kept in close contact with each other. Numeral 11 shows a magnetic field generating means for applying a magnetic field to the tapes wound on the take-up reel 7 and which is located under or over the tapes.

Explanation will be made now of the tape side control means 6. Referring to its first embodiment shown in FIG. 2, a non-magnetic rigid plate 13 is provided on one end of the spring 12 with its other end fixed on a base plate. The tapes 3 and 4, after being almost aligned transversely by means of the guide roller 5, have their lower edges pressed against the rigid plate 13, whereby the edges are brought into alignment and guided to the take-up reel 7. The action of spring 12 causes the bottoms of the tapes 3 and 4 to be pressed against the rigid plate 13 at an almost constant force since little, if any, staggering occurs in the running tapes. As a result, the tapes 3 and 4 are taken up smoothly without being bent or distorted or damaged by an excessive force.

The second embodiment of the tape-side control means, as shown in FIGS. 3*a* and 3*b* is placed upright on the base plate and has its top bent. It comprises a support plate 14 including a top portion 14' in parallel with the base plate and a spring plate 15 fixed on the under side of the top portion 14'. This embodiment produces the same effect as the first embodiment, except that, unlike the first embodiment, the spring plate 15 is movable only in the vertical direction resulting in a more positive controlling function.

Figure 4B:
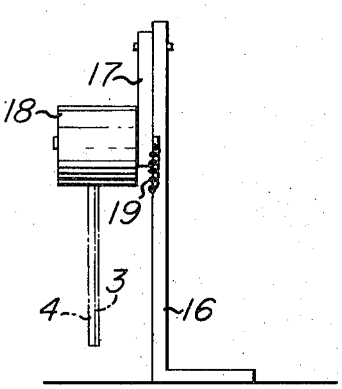

The third embodiment of the tape-side control means is shown in FIGS. 4*a* and 4*b* from which it is seen that the rotary arm 17 is supported on the support 16 disposed upright on the base plate, and a roller 18 is attached to the end of the rotary arm 17 so that the roller 18 is positioned on the top of the tapes. The rotary arm 17 is energized by spring 19 so that the roller 18 is pressed against the top of the tapes. The same effect is achieved by this embodiment as the first embodiment, and also the rotation of roller 18 reduces the friction with the tapes, preventing damage to the tapes and enabling a faster winding-up of tapes for improved efficiency.

Figure 5:
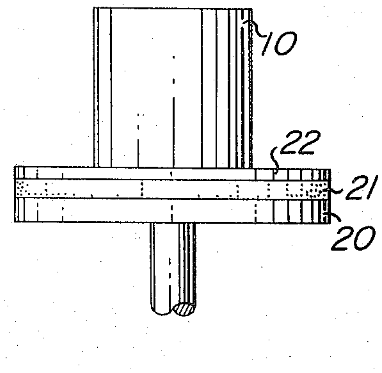
FIG. 5 shows a front view of a fourth embodiment of the tape-side control means.

In the fourth embodiment as shown in FIG. 5, the tape-side control means comprises a sheet 22 disposed above the flange 20 of the capstan 10 through the elastic material 21. This embodiment achieves the same effect as the first embodiment, except that in this embodiment, the tape controlling point is nearer to the take-up reel, reducing further the possibility of the tapes 3 and 4 being brought out of alignment after being controlled by the tape-side control means.

The above-description of the embodiments refers to the case in which the control means are in contact with the top or bottom of the tapes. But it is easy to modify it in such a way that the control means is in contact with such a side of the tapes as not shown in the drawings by changing the shape or size of the support means to meet the actual operating conditions.

It will be understood from the above explanation that, according to the invention, the side edges of the original and transfer tapes are successfully aligned, making possible improved take-up and transfer operations.

We claim:

1. In a magnetic tape transfer device in which there are provided a first supply reel around which a recorded original tape is wound, a second supply reel around which a non-recorded transfer tape is wound, a capstan to which the latest-wound portion of both the recorded original tape and non-recorded transfer tape are kept pressed, a take-up reel without any flange rotatably mounted on a rotary arm, means for energizing said rotary arm so that a side of said take-up reel contacts with said capstan, a guide roller with at least one flange provided between said supply reels and said take-up reel, a tape side control means elastically supported to be brought into contact with one side end of both tapes between said guide roller and said take-up reel and to be movable in the transverse direction of both tapes, and a magnetic field generating means for applying a magnetic field to both tapes wound on said take-up reel, both tapes being unwound from said supply reels and taken up on the take-up reel after being wound in a predetermined angle so that the magnetic surfaces of both tapes are brought into contact with each other by means of said guide roller.

2. A magnetic tape transfer device according to claim 1, wherein said tape side control means comprises a rigid plate in contact with the side ends of said tapes, and a coiled spring having an end supporting said rigid plate and the other end thereof fixed on a support means, said coiled spring driving said rigid plate toward said tapes.

3. A magnetic tape transfer device according to claim 1, wherein said tape side control means comprises a rigid plate contacted in parallel with the lower ends of said tapes, and a coiled spring having one end supporting said rigid plate and the other end fixed on a base plate.

4. A magnetic tape transfer device according to claim 1, wherein said tape side control means comprises a spring plate having a bent portion in contact with the side ends of said tapes and another portion fixed on a support means.

5. A magnetic tape transfer device according to claim 1, wherein said tape side control means comprises a support plate fixed on a base plate and having an upper portion bent in parallel with said base plate, said bent portion hanging over said tapes, and a spring plate fixed on the under side of said bent portion of said support plate.

6. A magnetic tape transfer device according to claim 1, wherein said tape side control means comprises a support plate fixed on a base plate, a rotary arm with one end mounted rotatably on said support plate, a roller rotatably attached to the other end of said rotary arm, said roller being in contact with the side ends of said tapes, and a spring for driving said rotary arm in such a direction that said roller is pressed against said tapes.

* * * * *